United States Patent [19]

Olausson et al.

[11] Patent Number: 5,944,950
[45] Date of Patent: Aug. 31, 1999

[54] PROCESS FOR THE FINAL EVAPORATION OF BLACK LIQUOR

[75] Inventors: Lars Olausson, Angered; Olle Wennberg, Göteborg, both of Sweden

[73] Assignee: Kvaerner Pulping AB, Sweden

[21] Appl. No.: 08/817,586

[22] PCT Filed: Sep. 5, 1995

[86] PCT No.: PCT/SE95/00991

§ 371 Date: Jun. 27, 1997

§ 102(e) Date: Jun. 27, 1997

[87] PCT Pub. No.: WO96/12848

PCT Pub. Date: May 2, 1996

[30] Foreign Application Priority Data

Oct. 20, 1994 [SE] Sweden ................................ 9403583

[51] Int. Cl.⁶ .............................. B01D 1/26; D21C 11/10
[52] U.S. Cl. ...................... 159/47.3; 159/13.2; 159/17.2; 159/20.1; 159/24.1; 159/24.3; 159/27.4; 159/49; 159/DIG. 8; 162/30.11; 162/47; 202/174; 203/71; 203/89; 203/DIG. 14
[58] Field of Search .............................. 159/47.3, 49.21, 159/27.4, 17.1, 172, DIG. 8, 24.1, 24.3, 20.1, 13.2; 162/30.11, 47; 202/173, 174

[56] References Cited

U.S. PATENT DOCUMENTS

| | | | |
|---|---|---|---|
| 2,651,356 | 8/1953 | Sadtler | 159/27.1 |
| 3,763,020 | 10/1973 | Drew et al. | 203/14 |
| 4,530,737 | 7/1985 | Östman | 159/47.3 |
| 4,857,146 | 8/1989 | Andersson | 162/31 |
| 4,909,899 | 3/1990 | Kiiskilä | 159/2.1 |
| 4,981,555 | 1/1991 | Hohmann et al. | 159/13.2 |

FOREIGN PATENT DOCUMENTS

WO 8400390  2/1984  WIPO .

OTHER PUBLICATIONS

Chemical Recovery In the Alkaline Pulping Process, 1985, Evaporation and Concentration of Black Liquor by Tappi Press, pp. 26–27.

*Primary Examiner*—Virginia Manoharan
*Attorney, Agent, or Firm*—Fasth Law Offices; Rolf Fasth

[57] ABSTRACT

The process for the final evaporation has at least two evaporation appliances. These appliances are coupled in series with respect to the black liquor and in parallel with the live steam (primary steam), which drives the evaporation, and with the secondary steam that is generated by the evaporation. The pressure of the primary steam that is supplied to the appliance(s) where the liquor concentration is at the highest concentration is greater than the pressure of the primary steam supplied to the other appliances where the liquor concentration is not so high.

10 Claims, 3 Drawing Sheets

PROCESS FOR THE FINAL EVAPORATION OF BLACK LIQUOR

TECHNICAL FIELD

The present invention relates to an improved final evaporation of black liquor from cellulose digesting in several, at least two, evaporation appliances of a type which is known per se.

STATE OF THE ART

Spent liquor from cellulose digesting, so-called black liquor, has a dry substance content of 14–17%. These substances are digesting chemicals which are to be recovered and organic substances, principally lignin residues, which are to be combusted. As a result of this low concentration of solid substances, the black liquor cannot be combusted directly and has, therefore, to be concentrated by evaporating off water. This evaporation takes place in different devices and results in a concentrated black liquor with a concentration in the region of 80%. This concentrated black liquor is then combusted in a recovery boiler while recovering chemicals and heat energy.

The evaporation usually takes place in a series of appliances which, in principle, are constructed as heat exchangers. They consist of a cylindrical container of substantial height, for example 8–10 meters, and are provided internally with heat-exchanging tubes or heat-exchanging plates. In a preferred embodiment, the heat exchanger consists of a tube assembly which is vertically placed between two tube plates which are drilled directly in front of the ends of the tubes so that liquid, black liquor, can be brought to flow vertically downwards inside the tubes while steam, which is to bring about the evaporation, is allowed to flow and condense on the outside of the tubes. The ends of the tubes are joined to the tube plates so that there is no communication between the inside and the outside, respectively, of the tubes. The black liquor consequently forms a falling film inside the tubes and gives off some of its water content in the form of steam, which is used for evaporation in other appliances. An appliance of this nature is termed a falling film evaporator. Normally, several such appliances are coupled in series. While they can be arranged so that the liquor flows countercurrent to the steam, concurrent devices are also known. In these latter devices, it is usual to have heat exchangers located between the evaporation appliances in order to increase the temperature of the liquor.

At atmospheric pressure, thin liquor having a dry substance content of 14–17% boils slightly above the boiling point of water (100° C.). However, the boiling point of the black liquor will increase gradually as the liquor is concentrated, and the elevation of the boiling point is, for example, approximately 8° C. for a liquor having a dry substance content of approximately 50%, approximately 12° C. for a liquor having a dry substance content of approximately 60%, and approximately 25° C. for a very concentrated liquor having a dry substance content of approximately 80%. This means that the steam which is fed on the outside of the tubes, and which is to bring about the evaporation, must have a condensation temperature which exceeds the boiling point of the most concentrated liquor, i.e. when the counterpressure of the evaporated steam on the liquor side is, for example, 1 bar (excess pressure) corresponding to a condensation temperature of 120° C., a temperature in the region of 145° C. must be imparted to the liquor film. In those appliances with a lower concentration of dry substance, for example 70% and 60%, the liquor film boils at 136 and 132° C., respectively.

It is previously known to feed steam, primary steam, which is at the same pressure and temperature, to all the appliances involved in the final evaporation effect and to bring together the evaporated steam from all the appliances into one and the same line under the same pressure. In such a case, therefore, the differences in temperature between the primary steam and the boiling points in the different appliances will be different.

In order to minimize the heat surface and to make it possible to wash the final evaporation effect, the latter is often divided into several appliances with the spent liquor being conveyed in series through the appliances. Since the same steam pressure pertains in all the appliances of the final evaporation effect on both the primary and secondary steam sides, the appliance containing the highest dry substance content, and therefore exhibiting the greatest increase in boiling point, will principally determine the lowest possible difference between the saturation temperatures of the primary and secondary steam sides. From the point of view of heating technology, the difference in temperature between the primary steam and the liquor will be unnecessarily large in the appliances with lower concentrations.

When the dry substance content is increased, the viscosity also increases. This increase in viscosity is especially pronounced at high dry substance contents (>50%). This increased viscosity impedes heat transfer. Since one and the same appliance operates with a dry substance content which corresponds to the outgoing dry substance content, the outgoing dry substance content will determine the heat transfer in the whole of this appliance. Dividing the final evaporation effect into several appliances, with the black liquor being conveyed in series through the appliances, renders it possible for one or more appliances to operate with a black liquor which is of lower dry substance content than that contained in the appliance which has the highest content. This will then facilitate heat transfer. There are, therefore, a number of grounds for dividing the final evaporation effect into several appliances.

European Patent Specification 365 060 describes a process in which the evaporated steam from an evaporation appliance is conveyed onwards to a second evaporation appliance with a higher dry substance content and in which the evaporated steam flows in on the liquor side, thereby shearing the falling film. This has the effect of improving heat transfer. This process is often termed steam recirculation.

TECHNICAL PROBLEM

While the temperature difference will therefore be small in the appliance(s) in which the concentration of dry substance in the liquor is highest, it will become ever larger as the concentrations decline in the upstream part of the system. This is not satisfactory from the point of view of heat economy, and various attempts have been made to improve the economy of the evaporation process.

SOLUTION

In accordance with the present invention, a process has therefore been produced for the final evaporation of black liquor in at least two evaporation appliances which are of a construction which is known per se and which are coupled in series with respect to the black liquor and in parallel with respect to the live steam (primary steam) which drives the evaporation, with the steam (secondary steam) which is generated by the evaporation being in open communication in both or all of the appliances, which process is characterized in that the pressure of the primary steam which is supplied to the appliance(s) in which the liquor is at the highest concentration is greater than that at which the primary steam is supplied to the other appliance(s).

According to the invention, it is expedient for the evaporation to be undertaken in at least two, preferably three or four, appliances of which the last, seen in the liquor direction, is fed with primary steam which is at a higher pressure than the steam fed to the remaining three. If three or more appliances are being used, it can be advantageous also to increase the steam pressure in the penultimate appliance, seen in the liquor direction.

In a mill for producing cellulose pulp, there are steam nets which are at different steam pressure levels. The so-called low pressure level (3–4 bar (excess pressure)) is normally used to drive the evaporation. For example, the primary steam to the first effect can then be at a pressure of 3 bar (excess pressure), corresponding to a condensation temperature of 143° C. The first effect often constitutes the final evaporation effect. According to the invention, one or more appliances are fed with primary steam at a pressure of, for example, 3 bar (excess pressure) while the primary steam pressure for the other appliances, which are fed with primary steam at a higher pressure, is, for example, 4.4 bar (excess pressure) (a condensation temperature of approximately 155° C.). This steam pressure is selected so that the resulting difference in temperature between the steam side and the liquor side is approximately equal to, or preferably somewhat greater, than that which pertains in the appliances for which the primary steam pressure is lower.

According to the invention, the pressure of the secondary steam can be 0.7 bar (excess pressure) and its saturation temperature can be greater than 115° C.

As a result of the process according to the present invention, the dry substance content of the liquor will exceed 70% when the latter leaves the final appliance, seen in the liquor direction.

The process according to the invention preferably comprises a so-called falling film process.

According to the invention, it is expedient for evaporated steam from appliances in the final evaporation effect which contain liquor of lower concentration to be supplied to the appliances which contain liquor of higher concentration together with the liquor for shearing the falling film. That is, the above described process, the so-called steam recirculation process is applied.

BRIEF DESCRIPTION OF THE DRAWINGS

The invention will be described in more detail below with reference to the attached drawings in which.

DETAILED DESCRIPTION

Figure 1:
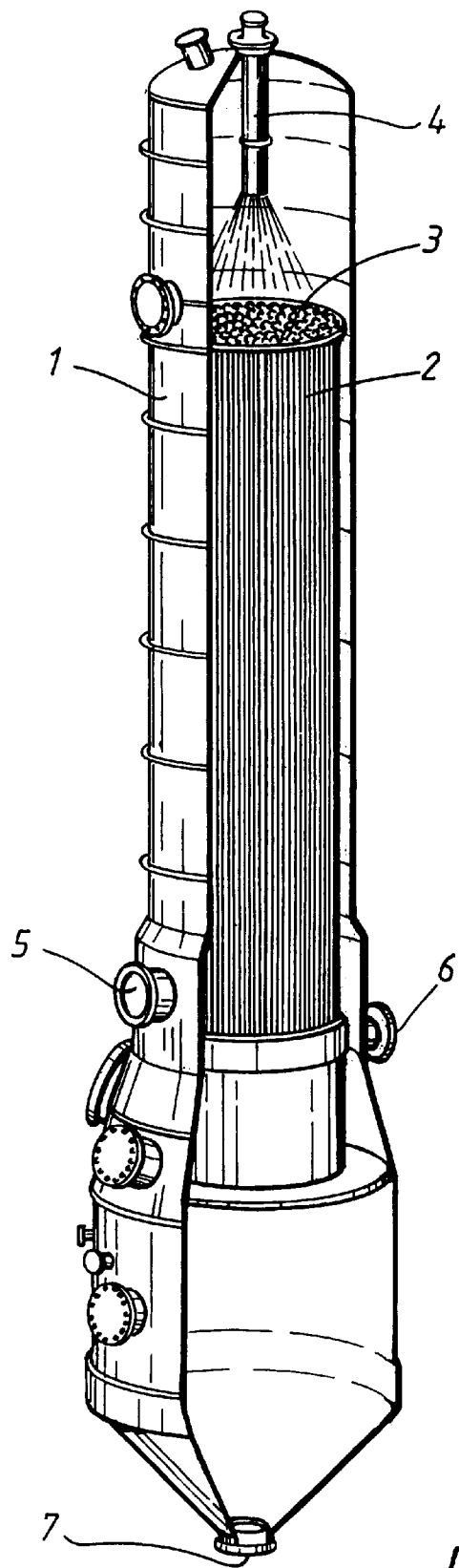
FIG. 1 is a representation, partly in section, of an evaporation appliance which is used in accordance with the present invention.

FIG. 1 shows an evaporation appliance which is used in the process according to the present invention. This appliance consists of a vertically elongated, virtually cylindrical outer casing 1 whose lower part is somewhat widened. Inside the cylindrical casing 1, there is a heat exchanger 2, which preferably consists of tubes through which the liquor is intended to run downwards and around which the primary steam is intended to condense in order to heat the tubes and evaporate the liquor. The tube assembly 2 is joined by its tube ends to a tube plate 3 at its upper part and to a tube plate 3 at its lower part. The tube plates 3 are drilled so that the tube ends coincide with these drill holes. A spraying device 4, for example, is present in the upper part for supplying liquor, which spraying device 4 distributes the liquor uniformly over the tube plate 3 and down through the tubes. The primary steam, which is intended to flow around the tubes 2, is introduced through an opening 5. Condensed steam is removed at the opening 6, and the concentrated liquor is removed at the opening 7 at the bottom of the appliance. Arrangements are made for returning a part of the concentrated liquor from the opening 7 to the spraying nozzle 4 in the upper part. Liquor which is to be concentrated is normally supplied in this return system, i.e. through one of the tube openings in the lower part of the appliance.

The appliance shown in FIG. 1 is preferred for the process according to the invention. It is constructed according to the falling film principle and is highly efficient. Flat heat-transferring surfaces can be used instead of tubes, and, in accordance with the invention, it is also possible to conceive of a process in which the liquor rises, a so-called rising film technique.

Figure 2:
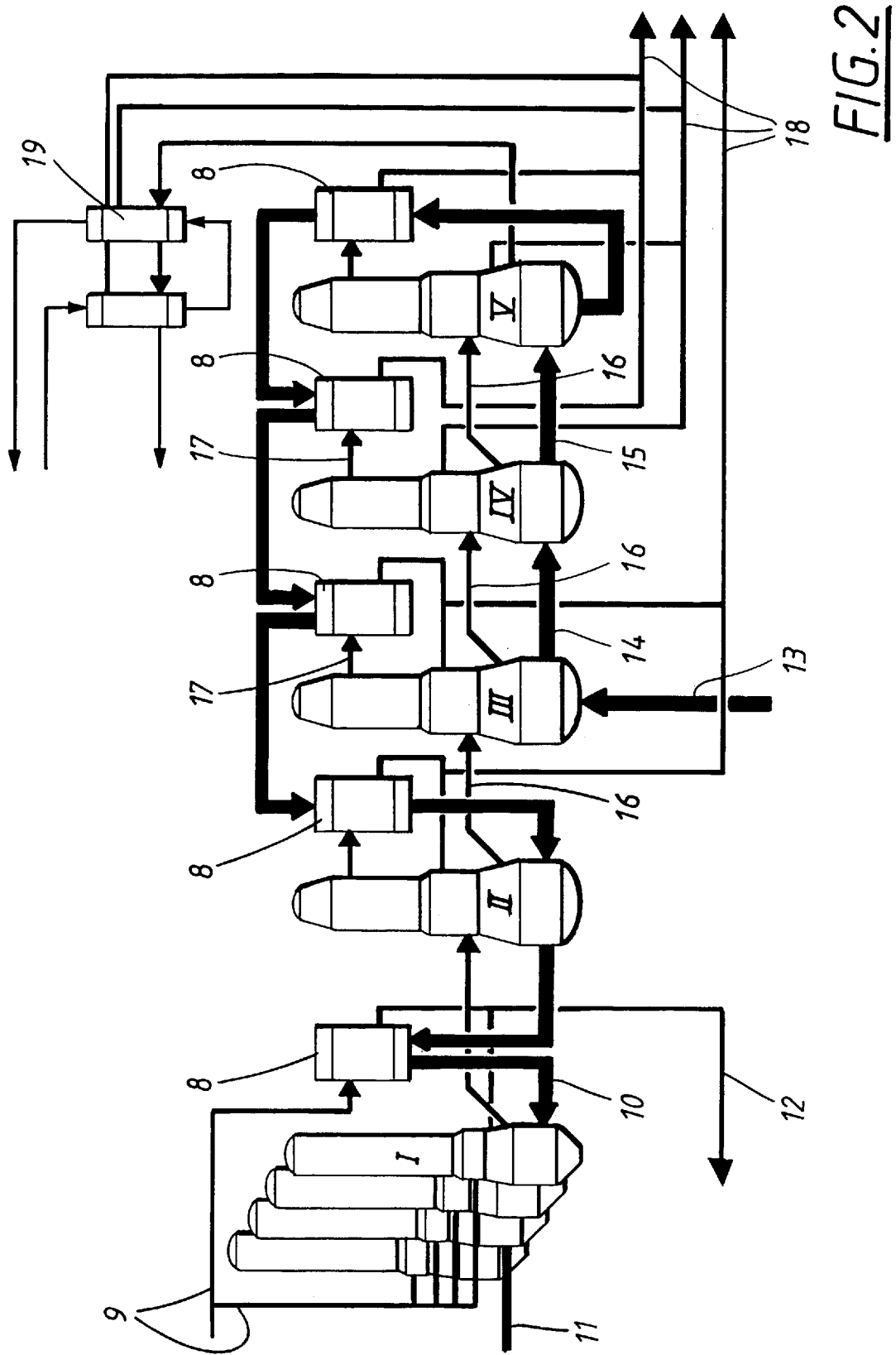
FIG. 2 is a more diagrammatic representation of an evaporation plant in accordance with the present invention.

FIG. 2 shows five so-called effects for the evaporation, with effect I consisting, in the drawing, of four units in accordance with FIG. 1, and effects II, III, IV and V consisting of individual units according to FIG. 1. Heat exchangers 8 of a suitable type are arranged between these effects for the purpose of raising the temperature of the liquor.

The final evaporation effect, namely effect I, is fed with live steam 9, with the four units being fed in parallel. As a result, it is easy to close down any one of them for cleaning. Liquor which has previously been concentrated in effects II, III, IV and V is fed into effect I at 10, and concentrated, finally evaporated liquor is removed at 11. A part of the live steam 9 is conducted to the heat exchanger 8 for the purpose of heating the liquor 10 which is to be fed into effect I. The condensate from this heat exchanger 8, and condensate from effect I, is conducted out at 12. Black liquor which is to be evaporated is conducted into effect III. Thin liquor from effect III is fed into effect IV through line 14, and from IV to V through line 15. Steam for evaporating the liquor in the different effects is taken from the preceding effect through lines 16, and heating steam for the heat exchangers 8 is taken from the preceding effect through lines 17. Condensate from the different units is removed through tubes 18. A heat exchanger 19 is arranged for final condensation of the evaporated steam from the last effect V. The device as shown in FIG. 2 is only one example of devices which can be used for the process according to the present invention. Thus, it is both possible and normal, for example, to arrange the evaporation in effects II, III, IV and V in accordance with the countercurrent principle. There is then no requirement for heat exchangers between the effects.

Figure 3:
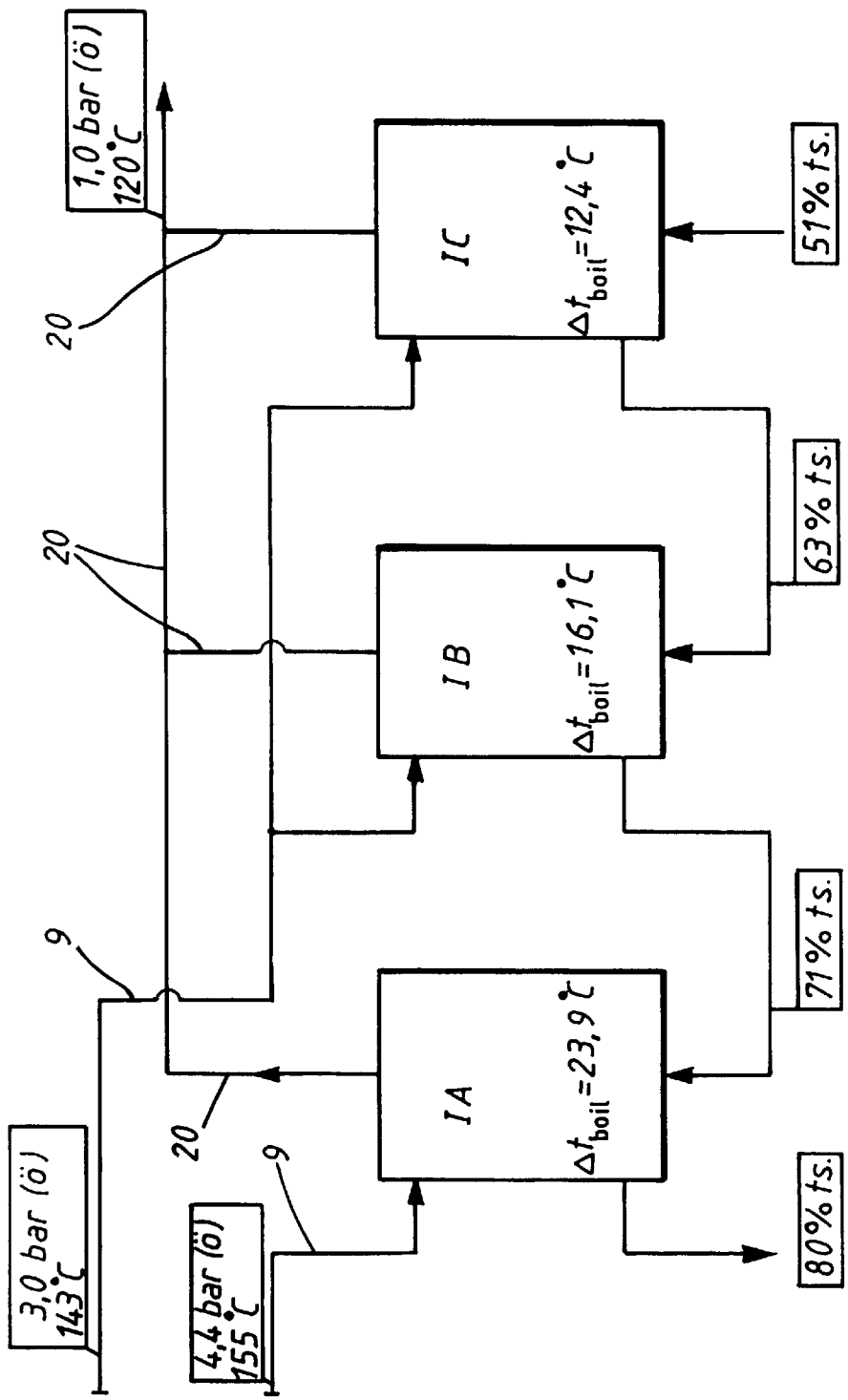
FIG. 3 is a diagrammatic representation of the process according to the invention.

FIG. 3 is a diagrammatic representation of the process according to the invention. The units IA, IB and IC are units in the final evaporation effect, that is three units in effect I as depicted in FIG. 2, each of which units is as shown in FIG. 1. According to former principles, live steam which was at the same pressure and temperature was introduced into all three of the units IA, IB and IC. FIG. 2, for example, depicts live steam being supplied in this way. However, in accordance with the present invention, live steam is supplied at a higher pressure to unit IA than to units IB and IC, namely, for example, 4.4 bar (excess pressure), and at a temperature of 155° C., as compared with 3.0 bar (excess pressure) and a temperature of 143° C. For example, the liquor which is fed into unit IC has a dry substance content of 51%, with the outgoing dry matter content being 63% and the boiling point elevation in IC therefore being approximately 12.4° C.; the dry substance concentration of the liquor in IB is 71%, and the boiling point elevation in IB is 16.1° C.; by contrast, the dry substance concentration in the liquor entering IA is 80%, which corresponds to a boiling point elevation of 24° C. The liquor which is removed from IA is highly concentrated liquor, i.e. liquor which has a dry substance content of 80%.

The units IA, IB and IC are in open communication with each other as regards their production of secondary steam 20, which is adjusted to a counterpressure of approximately 1.0 bar (excess pressure), which denotes a condensation temperature of 120° C. This steam is conveyed onwards to effect II.

According to the invention, the temperature difference between the outside and the inside of the tubes in unit IA is approximately 11° C., namely 155° C. on the outside and 144° C. on the inside (120° C. (at a steam pressure of 1.0 bar (excess pressure)) plus the boiling point elevation of 23.9° C.). This results in efficient evaporation which exceeds by far that which it would be possible to achieve using the process in accordance with the previously known technique, when steam at approximately 3 bar (excess pressure) was supplied to all the units IA, IB and IC. If, instead of passing steam at different pressures into these units, the pressure was raised and steam which was at the same pressure was passed into all the three units, this would then give rise to an unnecessarily large temperature difference in units IB and, in particular, IC.

As a result of the process according to the invention, which results in unit IA being much more efficient, this latter unit can be made smaller, with lower investment costs as a consequence, and the higher pressure which is possible to produce in the secondary steam can also be exploited for, where appropriate, introducing an additional effect or for decreasing the heat surface in the remaining effects, since a greater temperature difference is available.

When the above example is implemented, the heat surface which is required in effect I, comprising units IA, IB and IC, becomes 15% less. The higher pressure of the secondary steam can, in turn, be exploited for decreasing the heat surface in the remaining effects by 15%. In this way, the total heat surface in the plant becomes 15% less. The quantity of live steam at higher pressure which has to be supplied to unit IA is only 25% of the total quantity of live steam.

As has been mentioned above, low pressure steam (3–4 bar (excess pressure)) is normally used for driving the evaporation. This obliges us to use steam at higher pressure. Normally, medium pressure steam is also available in a pulp mill, which steam is usually at a pressure which is greater than 10 bar (excess pressure). This pressure is unnecessarily high in the present context and it may be necessary, therefore, to reduce the pressure of this steam. Increased use of medium pressure steam will lead to less steam passing through the turbine and, as a consequence, less electricity being generated. Instead of reducing the pressure of the medium pressure steam, by means of a reducing valve, the medium pressure steam can be used to drive a steam ejector which sucks in low pressure steam and raises the pressure of this steam. A process of this nature should then be able to decrease the requirement for medium pressure steam and would represent a method of compressing the low pressure steam by mechanical means.

The invention is not limited to the example described above and, instead, can be varied in different ways within the scope of the patent claims.

We claim:

1. A process for a final evaporation of black liquor, comprising the steps of:

supplying a black liquor to a first evaporation appliance to a second and a third evaporation appliance in series, the first evaporation appliance having a first concentration of solids and the second evaporation appliance having a second concentration of solids, the first concentration being greater than the second concentration;

connecting a primary steam carrying member of the second evaporation appliance to the third evaporation appliance in parallel;

connecting a secondary steam carrying member of the first evaporation appliance to the second evaporation appliance so that the first and second evaporation appliances are in open fluid communication;

supplying a first primary steam to the first evaporation appliance at a first maximum pressure and a first temperature;

supplying a second primary steam to the second evaporation appliance at a second maximum pressure and a second temperature, the first maximum pressure being greater than the second maximum pressure and the first temperature being greater than the second temperature;

driving an evaporation process with the first and second primary steam; and generating a first secondary steam by the evaporation process in the first evaporation appliance and generating a second secondary steam by the evaporation process in the second evaporation appliance, the first secondary steam having a first secondary steam pressure and the second secondary steam having a second secondary steam pressure, the first secondary steam pressure being identical to the second secondary steam pressure so that a resulting difference in temperature between a steam side and a liquor side of the first evaporation appliance is equal to or greater than a temperature difference between a steam side and a liquor side of the second evaporation appliance.

2. The process according to claim 1 wherein the process comprises passing black liquor through the second evaporation appliance and then passing the black liquor through the first evaporation appliance and feeding the first primary steam to the first evaporation appliance and feeding the second primary steam to the second evaporation appliance.

3. The process according to claim 2 wherein the process further comprises the steps of providing a pulp mill containing a low pressure steam having a pressure, the first maximum pressure of the first primary steam being greater than the pressure of the low pressure steam.

4. The process according to claim 1 wherein the process further comprises the step of concentrating the black liquor supplied to the first evaporation appliance so that a dry substance content of the black liquor exceeds 70% when the black liquor leaves the first evaporation appliance.

5. The process according to claim 1 wherein the process further comprises the step of evaporating the black liquor according to a falling film technique by permitting the black liquor to fall downwardly through the first and second evaporation appliances.

6. The process according to claim 5 wherein the process further comprises the steps of providing a heat exchanger having tubes disposed therein for shearing the falling film disposed on an inside of the tubes.

7. The process according to claim 1 wherein the process further comprises the step of increasing the steam pressure of the first and second primary steam by providing a steam ejector containing a driving steam having a pressure that is greater than the pressures of the first and second primary steam.

8. The process according to claim 1 wherein the method further comprises increasing the pressure of the first and second primary steam with a mechanical compressor.

9. A process for a final evaporation of black liquor, comprising the steps of:

coupling a black liquor carrying member of a first evaporation appliance to a second and a third evaporation appliance in series;

connecting a primary steam carrying member of the second evaporation appliance to the third evaporation appliance in parallel;

connecting a secondary steam carrying member of the first evaporation appliance to the second evaporation appliance so that the first and second evaporation appliances are in open fluid communication;

supplying a first primary steam to the first evaporation appliance at a first maximum pressure and a first temperature;

supplying a second primary steam to the second evaporation appliance at a second maximum pressure and a second temperature, the first maximum pressure being greater than the second maximum pressure and the first temperature being greater than the second temperature;

supplying a pulp mill in operative engagement with the second evaporation appliance, the pulp mill containing a low pressure steam having a pressure, the first maximum pressure of the first primary steam being greater than the pressure of the low pressure steam;

driving an evaporation process with the first and second primary steam;

generating a first secondary steam by the evaporation process in the first evaporation appliance and generating a second secondary steam by the evaporation process in the second evaporation appliance, the first secondary steam having a first secondary steam pressure and the second secondary steam having a second secondary steam pressure, the first secondary steam pressure being identical to the second secondary steam pressure;

passing black liquor through the second evaporation appliance and then passing the black liquor through the first evaporation appliance and feeding the first primary steam to the first evaporation appliance and feeding the second primary steam to the second evaporation appliance; and setting the low pressure steam to about four bar.

10. The process according to claim 9 wherein the method further comprises setting the pressure of the secondary steam to a value that is greater than 0.7 bar and setting a condensation temperature of the secondary steam that is greater than 115 Celsius.

* * * * *